No. 661,072. Patented Nov. 6, 1900.
P. ORSONI.
MACHINE FOR COLORING ILLUSTRATIONS.
(Application filed Apr. 14, 1899.)
(No Model.) 6 Sheets—Sheet 2.
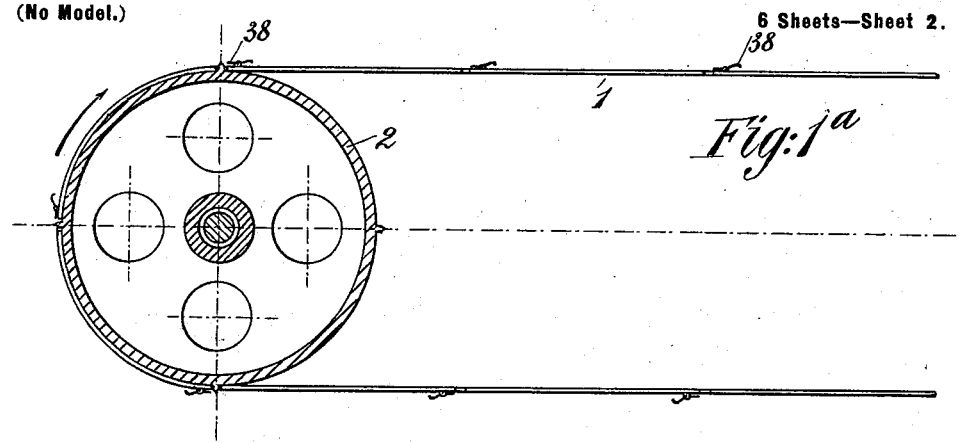
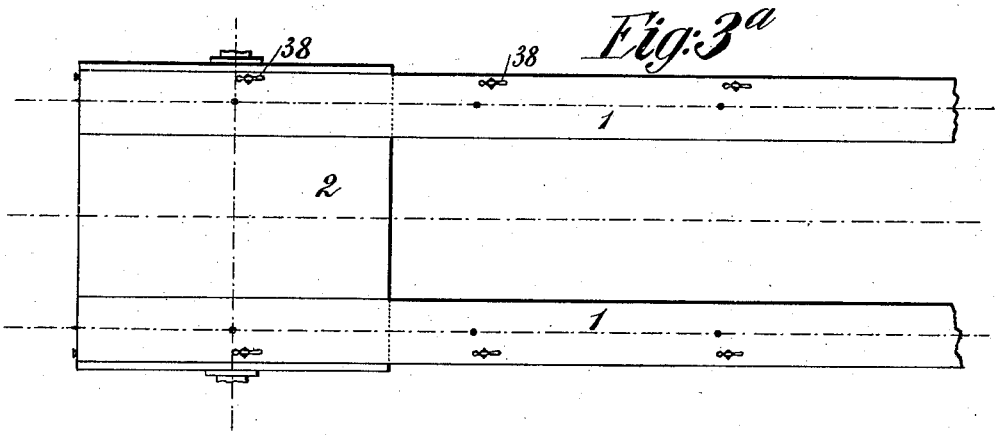
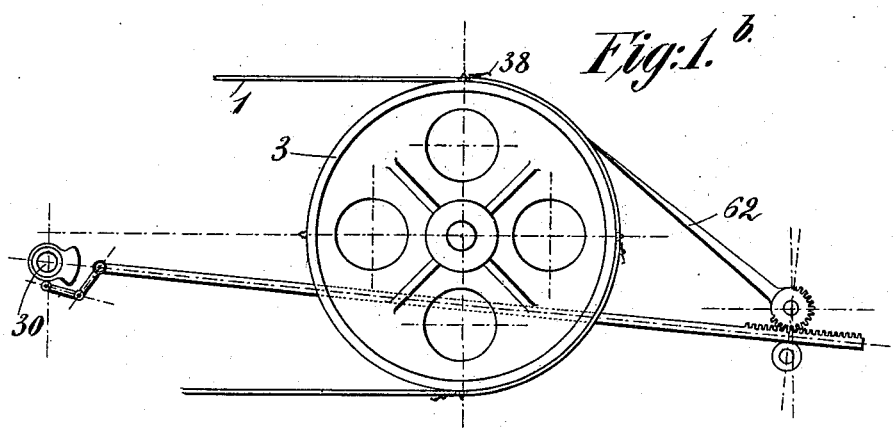
Witnesses
Edwin Drew Bartlett
Roland James Grant
Inventor
Philippe Orsoni
per Herbert Sefton Jones
Attorney.

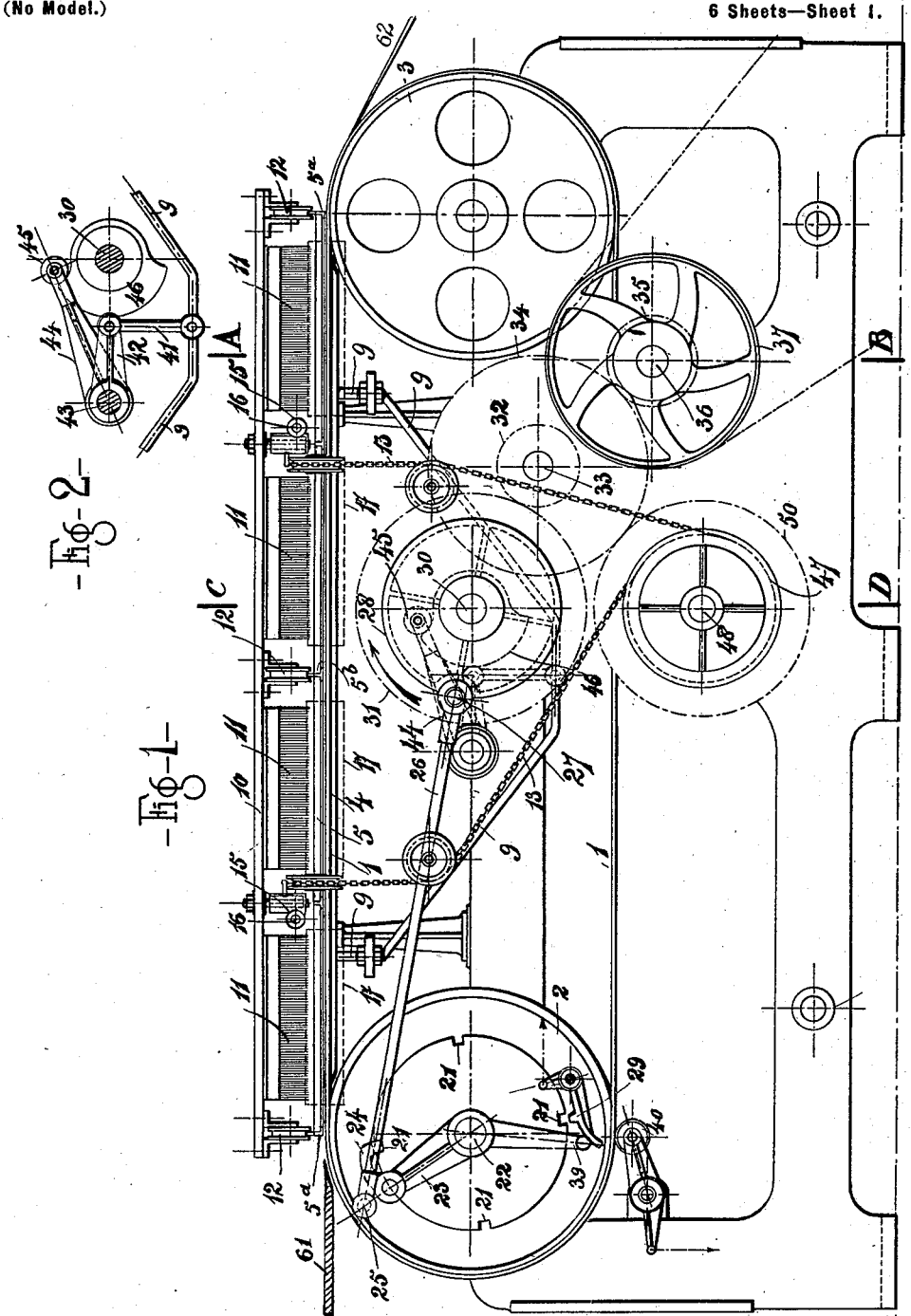

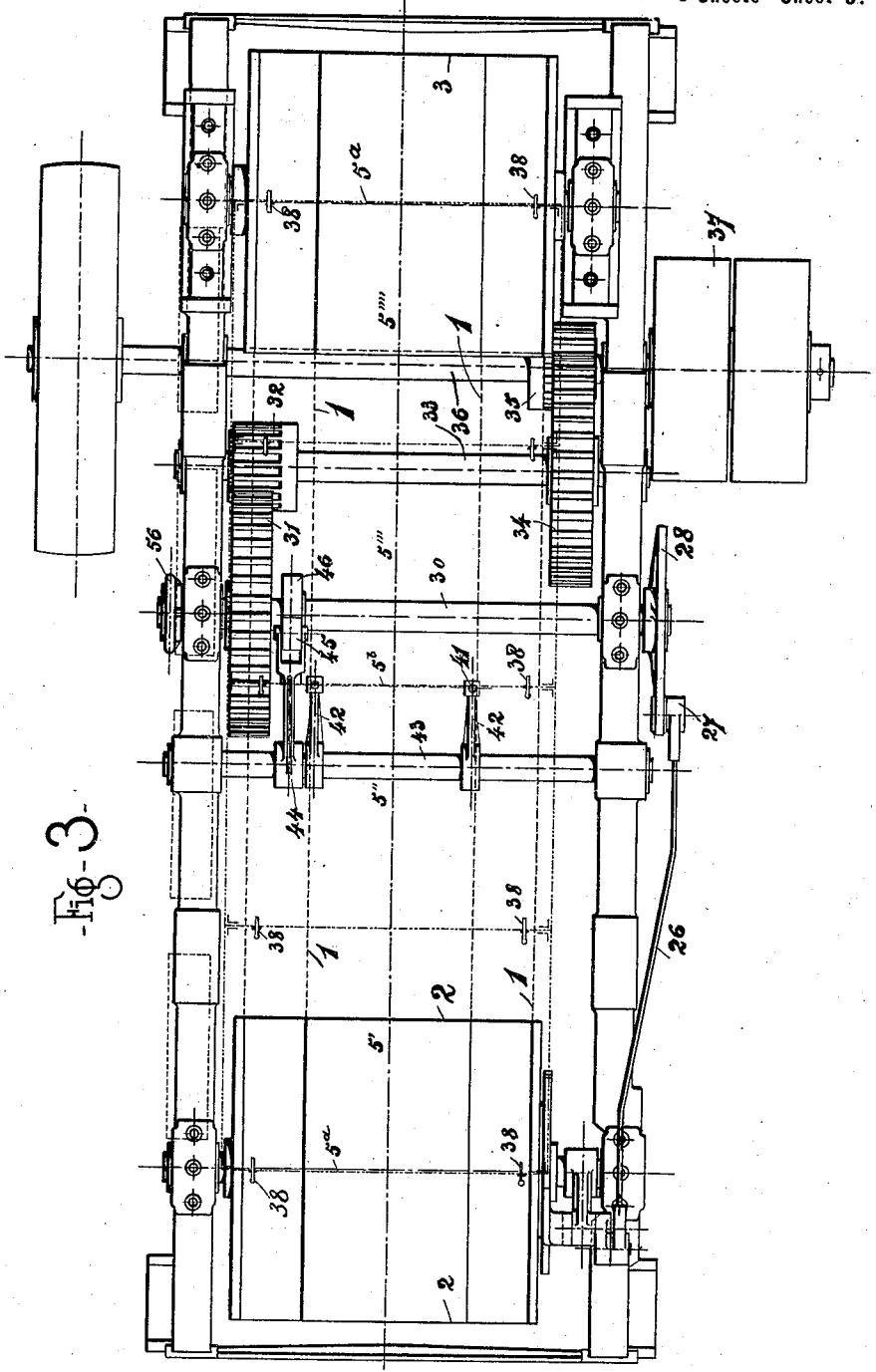

No. 661,072. Patented Nov. 6, 1900.
P. ORSONI.
MACHINE FOR COLORING ILLUSTRATIONS.
(Application filed Apr. 14, 1899.)
(No Model.) 6 Sheets—Sheet 4.
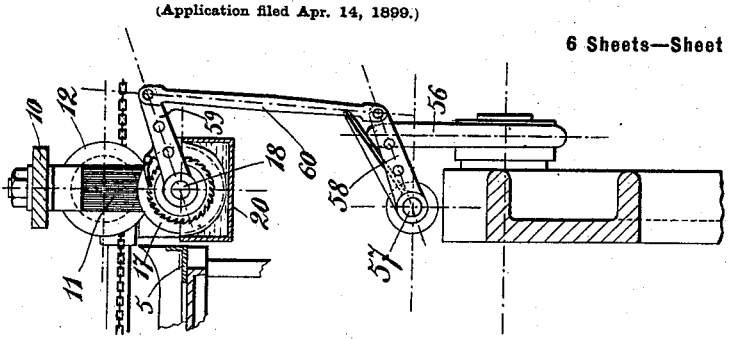
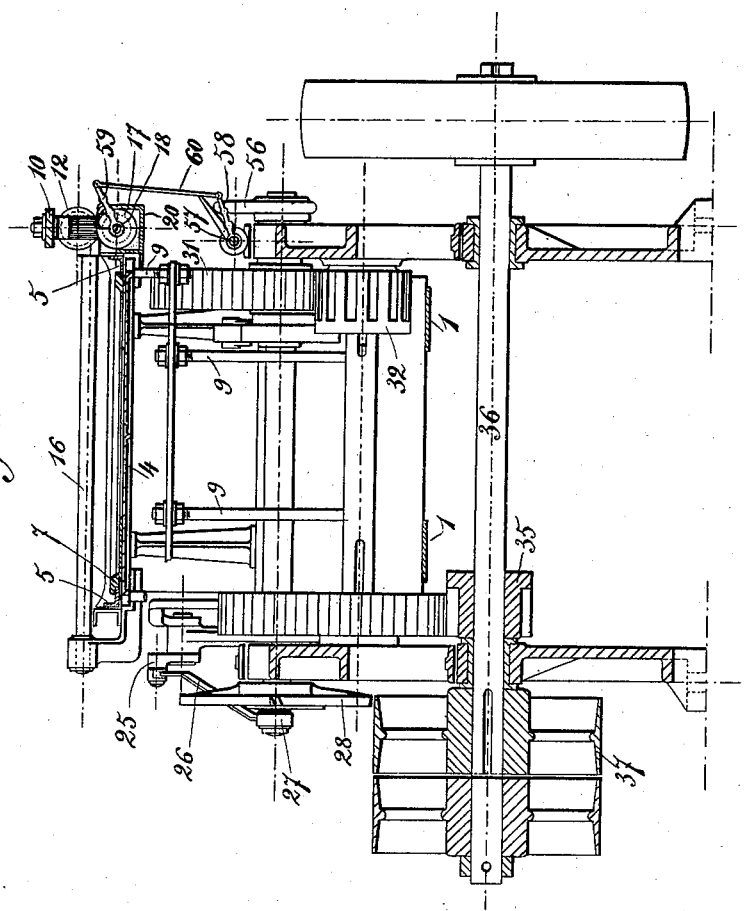
Witnesses
Edwin Drew Bartlett.
Roland James Grant.
Inventor
Philippe Orsoni
per Herbert Sefton Jones
Attorney.

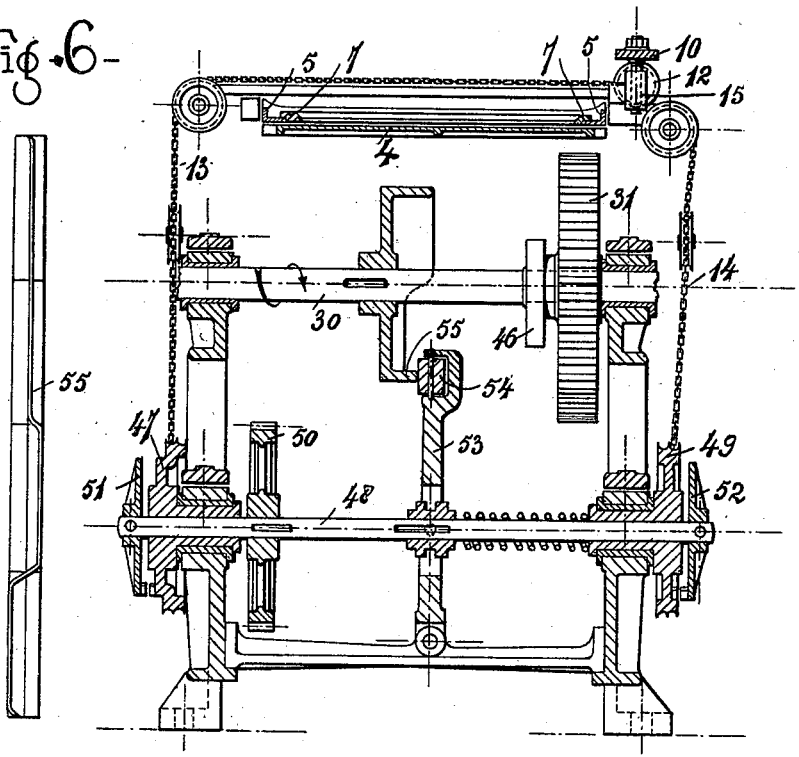

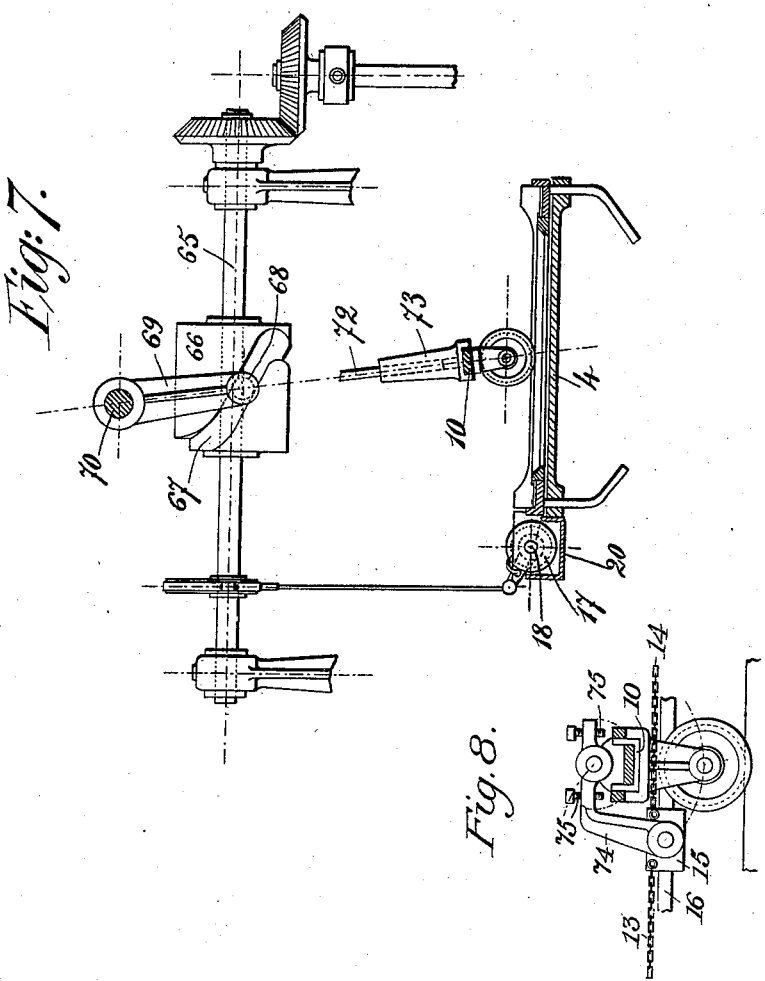

UNITED STATES PATENT OFFICE.

PHILIPPE ORSONI, OF PARIS, FRANCE.

MACHINE FOR COLORING ILLUSTRATIONS.

SPECIFICATION forming part of Letters Patent No. 661,072, dated November 6, 1900.

Application filed April 14, 1899. Serial No. 713,018. (No model.)

*To all whom it may concern:*

Be it known that I, PHILIPPE ORSONI, a citizen of the Republic of France, residing at No. 3 Rue de la Sabliere, Paris, in the Republic of France, have invented a new and useful Machine for Coloring Illustrations, Patterns, and the Like, (for which I have applied for a patent in France on the 28th of September, 1898, No. 281,722; in Great Britain on the 30th of December, 1898, No. 27,534; in Germany on the 28th of September, 1898; in Austria on the 31st of December, 1898; in Russia on the 10th of January, 1899; in Belgium on the 17th of March, 1899; in Italy on the 23d of March, 1899; in Switzerland on the 23d of March, 1899, and in Spain on the 27th of March, 1899,) of which the following is a specification.

This invention relates to a novel machine designed to color very quickly illustrations in periodicals or the like which are printed in a large number of copies, also for fashion-plates, maps, and other colored prints.

Referring to the accompanying drawings, Figure 1 illustrates an elevation of the machine, the front part of the frame being removed. Fig. 1ª illustrates a detail of Fig. 1, showing the paper-carrier with its propelling mechanism and clips 38 for holding the paper on an enlarged scale. Fig. 1ᵇ is a detail view showing the apparatus for taking off the colored sheets from the paper-carrier. Fig. 2 is another detail view of a portion of the apparatus not clearly shown in Fig. 1. Fig. 3 is a plan view indicating the general arrangement of parts, the bed-plate, the brushes, and their respective organs being omitted for the sake of clearness. Fig. 3ª is a plan view of the paper-carrier and its roller shown in vertical section in Fig. 1ª. Fig. 4 is a transverse section on the line A B of Fig. 1. Fig. 4ª is an enlargement of that portion of Fig. 4 which relates to the movement of the inking-rollers. Fig. 5 is a transverse section on the lines C D of Fig. 1. In this figure the apparatus relating to the motion of the brushes alone is illustrated. Fig. 6 is a tracing of the development of the operative edge of the cam 55. Fig. 7 shows an alternative construction for the actuating mechanism of the brushes. Fig. 8 is a special arrangement for the attachment of the brush-carrier.

The machine comprises in its essential construction a paper-carrier 1, formed of thin sheet-steel or other metal. This paper-carrier 1, which has the form of a wide endless belt, or for convenience of construction of two parallel endless belts, is supported by the rollers 2 3, of which the roller 2 conveys to the carrier the special motions, which will be explained further on. The upper horizontal portion of the paper-carrier 1 is, moreover, supported throughout its whole length by means of a fixed table or bed-plate 4, over which it travels. Upon the paper-carrier rests a frame 5, divided longitudinally into as many divisions 5' 5'' 5''', &c., as the machine is required to apply different colors. In each of these divisions there is placed and fixed by means of any suitable device a holder 7, bearing a cut-out pattern or stencil, which leaves visible all the portions of the picture which are to receive the corresponding color. This frame 5 is absolutely fixed in position in the horizontal direction, but it is capable of being raised vertically to a short distance above the paper-carrier 1. This rising motion is produced at the suitable moment by means of a system of bent rods 9, suitably guided at their upper parts in the sides of the fixed table 4. The various divisions 5' 5'' 5''', &c., of the frame 5 are produced by means of angle-irons connecting transversely the two longitudinal sides of the frame, and their edges 5ª, as well as some intermediate pieces 5ᵇ, serve as rails for the brush-carrier. The brush-carrier is formed of a long bar 10, extending the whole length of the upper horizontal part of the paper-carrier. This bar, which is capable of being moved transversely above the frame 5 in the manner set forth hereinafter, carries a brush 11 above each division of the frame and is supported by flanged wheels 12, which revolve upon the cross-pieces 5ª 5ᵇ of the frame, serving as rails. The bar 10 is, moreover, carried upon the supports 15, each of which slides upon a guide-bar 16, fixed above the table. The brush-carrier can thus move over the whole width of the frame 5. This motion is produced by the successive action of the chains 13 and 14, two of which are fixed on each side of the supports 15, which carry the bar 10. Upon one of the sides of the machine, parallel to its longitudinal axis, there are placed the inking-rollers 17, the same in number as the frames 7, and each corresponding to one thereof. The said rollers, which are mounted loosely upon a common axle 18, dip at their lower part into vessels 20, containing the colors. The amount of the motion of the brush-carrier is so adjusted that the brushes after having been moved upon the frame are caused to adjust themselves and rest for a moment above the rollers 17, with which they come in contact, in order to take up the colors. The brush-carrier is then supported by fixed plates, which form prolongations of the rails formed by the transverse pieces $5^a$ $5^b$, &c., of the frame.

Having thus given a preliminary description of the essential parts of the machine, I will now proceed to explain, with reference to various details, the manner in which the same are put in operation.

*The paper-carrier.*—As has been stated before, the paper-carrier, which in the machine illustrated in the drawings is formed of two parallel endless bands, is set in motion by means of the roller 2. For this purpose the roller has upon one of its ends a ring provided with four notches 21, placed at one-quarter of a circle distance one from the other. Upon the axle 22 of the said drum 2 there is loosely mounted a lever 23, having at its end a catch 24, arranged to engage successively in each of the said notches 21. The prolongation 25 of the said catch 24 is articulated to the end of a connecting-rod 26, which rod is attached at its other end to the pivot 27 of a wheel 28. The radius of this wheel 28 is arranged to correspond exactly to one displacement of the lever 23, equal to one-quarter of a revolution. It will therefore be understood that if the wheel 28 receives a continuous rotary motion in the direction of the arrow, Fig. 1, it will carry with it the roller 2 as long as the pivot 27 is passing through its upper half-turn, while during its passage through the lower half-turn it will simply push back the lever 23, the catch 24 being raised, and consequently leaving the drum 2 stationary in the position in which it has just been placed. All disturbance of the said roller 2 is, moreover, prevented by means of the catch 29, attached to the frame, which catch engages in the corresponding notch of the roller 2. In order that during the succeeding motion the revolution of the roller 2 should not be prevented by this catch 29, there is provided a prolongation 39, attached to the lever 23, which prolongation raises the catch 29 out of the notch in which it rested when the roller is required to be moved. The development of a quarter of the circumference of the roller corresponds exactly to one division of the frame, so that each time that the roller makes a quarter-turn the paper or periodical is moved by the carrying-belt and passes under the next division of the frame. The wheel 28 is keyed upon a shaft 30, which has at its other end a tooth-wheel 31, gearing with the pinion 32, and an intermediate shaft 33, which shaft receives its own motion by means of the wheel 34 and the pinion 35 from the shaft 36, which is in turn driven by means of the belt-pulley or the like 37. The paper-carrier moves by spaces corresponding exactly to the development of one-fourth of the circumference of the roller, and the spring-clips 38 serve to attach and to carry the paper along with the motion of the carrier. In order to assure the absolutely mathematical correspondence of the motion of the carrying-belt, (which is of the greatest importance for the register,) the roller 2 bears four conical studs, Fig. $1^a$, which engage in holes of the same size pierced in the paper-carrier 1, which carrier is strengthened at these points by an increased thickness of metal. The adhesion of the paper-carrier 1 to the roller 2 is secured without causing unnecessary tension by means of the little flanged-wheel 40, which is applied beneath the roller 2. The other roller 3 serves only to support the paper-carrier and revolves loosely upon its axle. A suitable arrangement is made use of for causing the position of this axle to vary according to requirements in order to regulate the tension of the paper-carrier.

*The frame.*—It has been already stated that the rising motion of the frame is produced by the system of rods 9, placed beneath it. Reference being made to Fig. 2, it will be seen that these rods are connected to the parts 41, which are in turn articulated to the ends of the levers 42, keyed upon the shaft 43. This shaft has near one of its ends another lever 44, provided with a roller 45, which rests upon the cam 46, keyed upon the shaft 30. This cam 46 possesses a part of small diameter corresponding to the lower position of the frame and a part of greater diameter opposed to the first and corresponding to the raised position of the frame. Each double motion of rising and falling of the frame consequently corresponds to a quarter-turn of the roller, and consequently to the advance of the paper-carrier by one division. The cam 46 is keyed upon the shaft 30, so that the motion of the frame is produced at the same time as the motion of the paper-carrier, but commencing slightly before the same in order that the paper-carrier may be free when its motion commences.

*The brushes.*—The movement of the brushes is effected by means of the chains 13 14 in the manner hereinafter described, reference being made to Figs. 1 and 5. The two chains 13, placed at the same side of the bar 10, which carries the brushes, are each fixed at their other end to a wheel 47, having a double groove in which they can roll up. This wheel 47 is loose upon the shaft 48. The same arrangement is applied to the two chains 14, fixed on the other side of the bar 10. It is consequently only needful to cause the rotation of one of the wheels 47, for example, to occasion the motion of the brushes from right to left, and then the actuation of the other wheel 49 will cause the motion of the brushes from left to right. When the wheels 47 and 49 are stationary, the brushes remain motionless. If now the shaft 48 be actuated by a continuous rotary motion communicated to it by means of the gear-wheels 34 and 50, the revolution of the wheel 47 is effected by the mechanism 51 and that of the wheel 49 by the like mechanism 52. The parts 51 and 52 being fixed at the two ends of the shaft 48, it is only needful to cause this shaft to move longitudinally in the one or the other direction to engage the one or the other mechanism. The intermediate position of the shaft 48 will give the position of release—that is to say, the wheels 47 and 49 are stationary, and consequently the brushes also. The longitudinal motion of the shaft 48 is produced by means of the forked lever 53, the roller 54 of which rests constantly upon the edge of the cam 55, keyed upon the shaft 30. The development of this cam, (see Fig. 6,) as well as the speed of rotation of the shaft 48, must be such that the different motions of the brushes are produced at the time required and in such a manner that their double motion be made while the frame 5 is stationary upon the paper-carrier and that their position upon the inking-rollers takes place during the rise of the said frame 5. The rotation of the inking-rollers is produced by means of the cam 56, the shaft 57, the arms 58 and 59, connected together by the rods 60, and a system of rack and pinion. This motion can be regulated for each roller separately by altering the point of the junction of the corresponding arms 58 and 59 with the bar 60.

*The operation of the machine.*—The foregoing explanations have set forth the operation of the parts of the machine in general, and this will now be made more clear by describing the operation of printing a periodical or the like from the moment of its insertion into the machine up to its exit therefrom. The paper which is taken upon the table 61 of the machine is placed by the operator under the two clips 38 of the paper-carrier, which are at this moment practically in the vertical axis of the roller and which clips are at that moment raised by the pressure of the frame or of projections fixed thereto. This operation is effected during the period when the drum is stationary, corresponding also to the lowest position of the frame 5 and to the displacement of the brushes 11 above the same. It should, moreover, be remarked that the two clips 38 alluded to are at this moment raised by means of the projections fixed to the frame striking when said frame is in the lowest position upon the prolongations of the clips, and thereby opening them. During this period the catch 24 places itself in the corresponding notch of the roller 2, which is then revolved a quarter-turn, as already explained. The paper-carrier 1 has consequently been moved on for the space of one division, and the paper carried with it (the clips released by the frame having immediately gripped the paper) is placed under the division 5' of the frame. This motion is, moreover, aided by the rising of the frame and is effected at the proper time by means of the organs already described. As soon as the paper-carrier has completed its motion the frame is again lowered upon it and the stencil of the holder 7 is applied to the paper. There then occurs a stationary period for the paper-carrier and the frame, and during this time the brushes, previously charged with color by contact with the inking-rollers, pass over the frame and color those parts of the paper left exposed by the stencils. The combination of the same motions is then reproduced. The paper passes into the second division 5'' of the frame and receives there a second coat of color. It then passes into the third division 5''', &c., until it has traveled to the farther end of the paper-carrier. As soon as the paper emerges from the last division of the frame it is seized by the taking-off mechanism 62, which delivers it upon a table arranged to receive it. This taking-off mechanism may be of any suitable kind and actuated as may be desired. As soon as the first paper passes from the first division of the frame to the second another copy is placed upon the roller and arrives subsequently to occupy the first division of the frame, &c., so that there are always upon the machine as many copies as there are colors. In the machine which is illustrated in the accompanying drawings the frame contains four divisions, which admit of the application of four different colors to the paper. It is obvious that on the same principle machines may be made for any other combination of colors, either more or less in number. As has been already said, in the machine illustrated the paper-carrier 1 is formed of two parallel endless bands placed at a suitable distance apart; but the carrier might also be formed of a single band of the requisite width.

The means which have been described for producing the transverse motion of the brushes may be replaced by the alternative, which is illustrated in diagram in Fig. 7. A transverse shaft 65, placed above the machine and driven with a continuous rotary motion, bears a cam 66, in the groove 67 of which engages a terminal roller 68 of a lever 69, keyed upon the shaft 70. The outline of the groove 67 is such as to produce at a suitable time a partial alternative rotation of the shaft 70, which effects the required movement of the brushes. For this purpose the shaft 70 bears fixed at suitable points, by means of sleeves or the like, bars 72, each of which engage freely with their other end into a corresponding socket 73, attached to the brush-holder 10. It will be seen that the alternating rotary motion of the shaft 70 transmits a rectilinear alternating motion to the brush-holder, the bars 72 sliding in the sockets 73.

Fig. 8 illustrates a modification in the method of attachment of the bar 10, supporting the brushes, for the purpose of causing the said brushes to slope in the direction of the motion, which may be of advantage for the perfect execution of the work. For this purpose the bar 10 is pivoted to the lever 74, which is itself pivoted to the socket 15, to which are attached the driving-chains 13 14. In this manner the brushes, in consequence of their friction upon the surface, incline naturally, doing the work, the amount of inclination being regulatable by means of the set-screws 75.

What I claim is—

1. In a machine for coloring illustrations and the like, a frame, a flat table supported by the said frame, an endless paper-carrier, a stencil-frame, a system of brushes above the said stencils, and means for actuating and inking the said brushes, substantially as described.

2. In a machine for coloring illustrations and the like, a frame, a flat rigid table supported on said frame, a revolving endless metallic paper-carrier, gearing for intermittently actuating the said paper-carrier, an adjustable frame superposed above the said paper-carrier, stencils for intercepting the color applied to the paper on said paper-carrier, a series of coloring-brushes supported by the adjustable frame, inking-rollers periodically in contact with the said brushes, apparatus for intermittently actuating the said brushes, and take-off mechanism for delivering the printed sheets, substantially as described.

3. In a machine for coloring illustrations and the like, in combination with an endless metallic paper-carrier, gearing actuated by eccentrics and connecting-rods from the main shaft conveying to the said paper-carrier intermittent motion in lengths of uniform and adjustable distance, in combination with a geared driving-roller having studs adapted to engage in the perforated reinforced edges of the said metallic paper-carrier.

4. In a machine for coloring illustrations and the like, coloring-brushes, suspending-chains passing over wheels actuated by gearing and capable of occasioning motion of the brushes alternately to and fro, inking-rollers rotated by gearing operating regulatably for each roller, said rollers dipping in vessels capable of containing color.

5. In a machine for coloring illustrations and the like, stencil-plates, a divided frame holding said stencil-plates, coloring-brushes reciprocating over the said stencil-plates, means for supplying the said coloring-brushes with color, and a plurality of pivoted double-lever bars attached to the said brushes and controlling the slope thereof, substantially as described.

6. In a machine for coloring illustrations and the like, a frame, a flat rigid table supported by the said frame, the paper-carrier 1, the supporting-rollers 2 and 3, the pivoted frame 5, the stencil-holder 7, the brushes 11, the brush-chains 13 and 14, the brush-carrier 15 and the inking-rollers 17, substantially as described and shown.

7. In a machine for coloring illustrations and the like, the means for actuating the rotary endless paper-carrier in unison with the motion of the stencil-frame comprising the roller 2, the controlling-ring attached thereto with quadruple notches 21, the two-armed coaxially-mounted lever 23 bearing stop-catch 24 controlled by the connecting-rod 25 pivotally connected to a wheel 28 in connection with a source of power; a catch 29 pivotally supported on the machine-frame locking the roller 2 at each quarter-revolution, a pin 39 on the other arm of the lever 23 adapted to raise the catch 29 at the commencement of each stroke of the connecting-rod 26, and quadruple studs on the outer edges of the periphery of the roller 2 engaging in correspondingly-spaced perforations in the reinforced edges of the paper-carrier.

In witness whereof I have hereunto set my hand in presence of two witnesses.

PHILIPPE ORSONI.

Witnesses:
   J. ALLISON BOWEN,
   GEO. E. LIGHT.